No. 670,503. Patented Mar. 26, 1901.
F. H. COWLES.
LUGGAGE CARRIER FOR BICYCLES.
(Application filed Aug. 27, 1900.)

(No Model.) 2 Sheets—Sheet 1.

Witnesses Inventor
F. H. Cowles.,
By Victor J. Evans. Attorney

THE NORRIS PETERS CO., PHOTO-LITHO., WASHINGTON, D. C.

No. 670,503. Patented Mar. 26, 1901.
F. H. COWLES.
LUGGAGE CARRIER FOR BICYCLES.
(Application filed Aug. 27, 1900.)
(No Model.) 2 Sheets—Sheet 2.
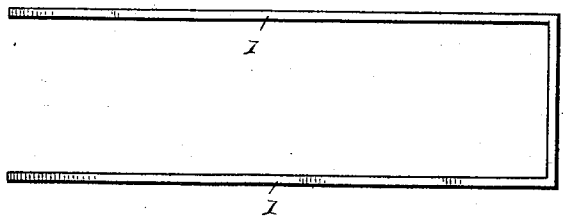
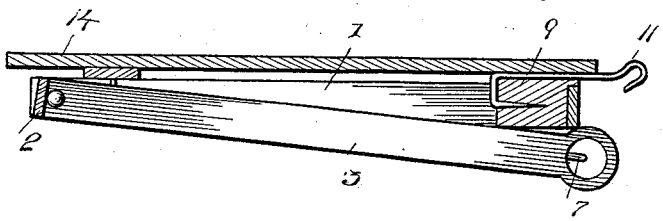
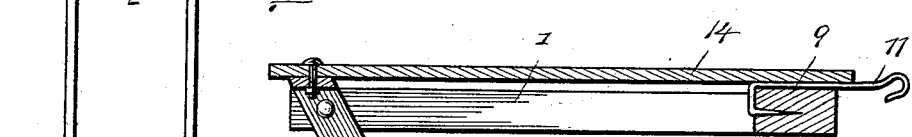
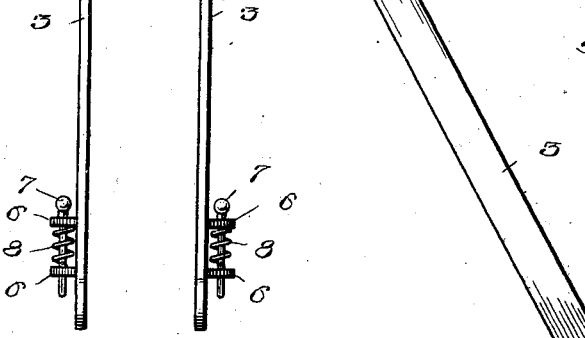
Witnesses
Inventor
F. H. Cowles,
By Victor J. Evans, Attorney

UNITED STATES PATENT OFFICE.

FRANK H. COWLES, OF MOUNT MORRIS, MICHIGAN.

LUGGAGE-CARRIER FOR BICYCLES.

SPECIFICATION forming part of Letters Patent No. 670,503, dated March 26, 1901.

Application filed August 27, 1900. Serial No. 28,176. (No model.)

*To all whom it may concern:*

Be it known that I, FRANK H. COWLES, a citizen of the United States, residing at Mount Morris, in the county of Genesee and State of Michigan, have invented a new Bicycle Luggage-Carrier, of which the following is a specification.

This invention relates to new and useful improvements in luggage-carriers for bicycles; and its primary object is to provide a device of simple construction which may be readily attached to a bicycle of ordinary form and which may be quickly removed therefrom and folded, if desired.

A further object is to construct a device which is light, durable, and cheap to manufacture.

With these and other objects in view the invention consists in providing a platform constructed, preferably, of a single piece of metal which is substantially U shape in form and between the ends of which is pivoted a yoke adapted to extend on opposite sides of the rear wheel of the bicycle and to be secured thereto in any manner, as will be hereinafter more fully described.

The invention also consists in providing a novel arrangement of hooks upon the platform, whereby the device may be attached to the frame of a bicycle.

The invention also consists in the further novel construction and combination of parts hereinafter more fully described and claimed, and illustrated in the accompanying drawings, which form a part of the specification, and in which—

Figure 1:
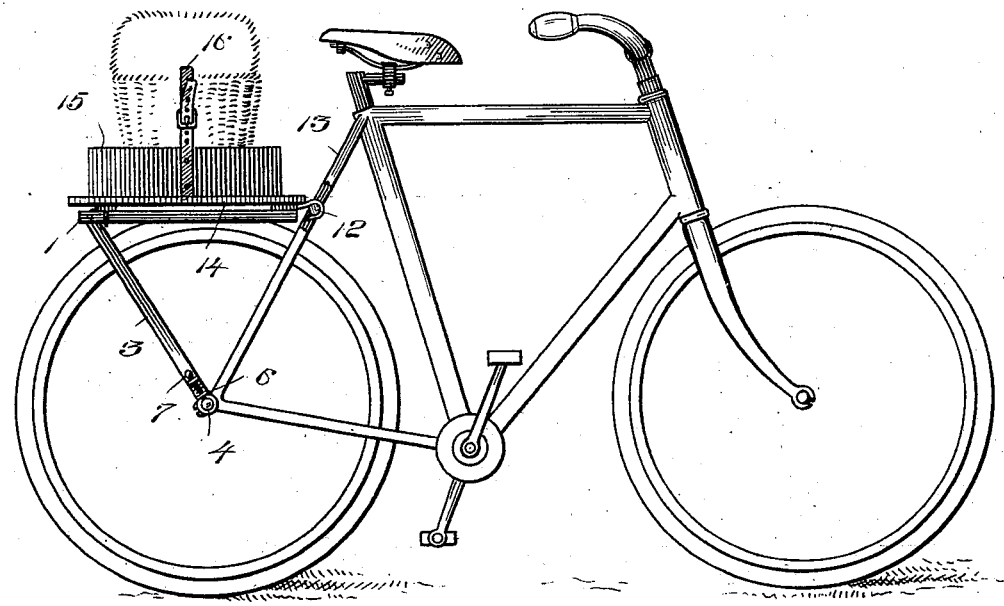
Figure 2:
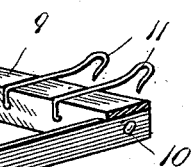

Figure 1 is a side elevation showing the device in position upon a bicycle. Fig. 2 is a perspective view of the attachment detached. Fig. 3 is a detail view of the frame of the platform. Fig. 4 is a detail view of the yoke. Fig. 5 is a view of the attachment in folded position, and Fig. 6 is a longitudinal section through a modified form of carrier.

Referring to the figures by numerals of reference, 1 is a substantially U-shaped frame, between the ends of which is pivoted a yoke 2, having arms 3 extending downward therefrom and provided with apertures adjacent to their free ends for the reception of the axle 4 of the rear wheel 5 of the velocipede. Ears 6 extend from the outer faces of these arms 3, and slidably mounted therein are bolts 7, which are held normally projected downward by means of a coil-spring 8 or in any other suitable manner. These bolts are adapted when the arms are placed in position upon the axle 4 to extend into transverse passages formed within the axle, thereby securely fastening the yoke 2 in position. A block or cross-strip 9 is secured between the sides of the frame 1 at a point adjacent to the free end thereof, screws 10 being preferably employed for this purpose. Hooks 11 are secured to this block and extend therefrom and are adapted to engage the cross-bar 12, connecting the rear braces 13 of the velocipede-frame.

A platform 14 is secured upon the frame in any suitable manner, and bolted thereon is a box or other receptacle 15, which is provided with a strap 16 or other suitable means whereby articles placed therein may be readily secured in position. It will be seen that the device may be readily attached to a bicycle by placing the bolts 7 into engagement with the axle 4 and by placing hooks 11 upon the cross-strip 12 of the velocipede-frame. When it is desired to remove the carrier, it is merely necessary to disengage these parts, and the yoke 2 can then be swung upward upon its pivots until it arrives between the sides of the frame 1.

While this device is preferably constructed so as to be folded when not in use, I do not limit myself to this particular construction, for, if desired, the platform 14 may be secured to the upper end of the yoke 2, thereby holding the yoke in a fixed relation to the frame 1. This construction I have illustrated in a section shown in Fig. 6.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as fairly fall within the scope of my invention.

Having thus fully described my invention, what I claim as new, and desire to secure by Letters Patent, is—

1. The combination with a frame, of hooks at one end thereof, a yoke secured within the opposite end of the frame and having apertures in the free ends thereof, and sliding bolts mounted upon the yoke adjacent to each aperture whereby the same may be secured to the axle of a wheel of a velocipede.

2. The combination with a frame, of hooks extending from one end thereof, a yoke pivoted within the remaining end of the frame, said yoke having apertures therein adjacent to its free ends, and sliding bolts mounted upon the yoke adjacent to each aperture whereby the same may be secured to the axle of a wheel of a velocipede.

In testimony whereof I have signed my name to this specification in the presence of two subscribing witnesses.

FRANK H. COWLES.

Witnesses:
  H. W. GRAHAM,
  A. L. ADAMS.